Figure 1:
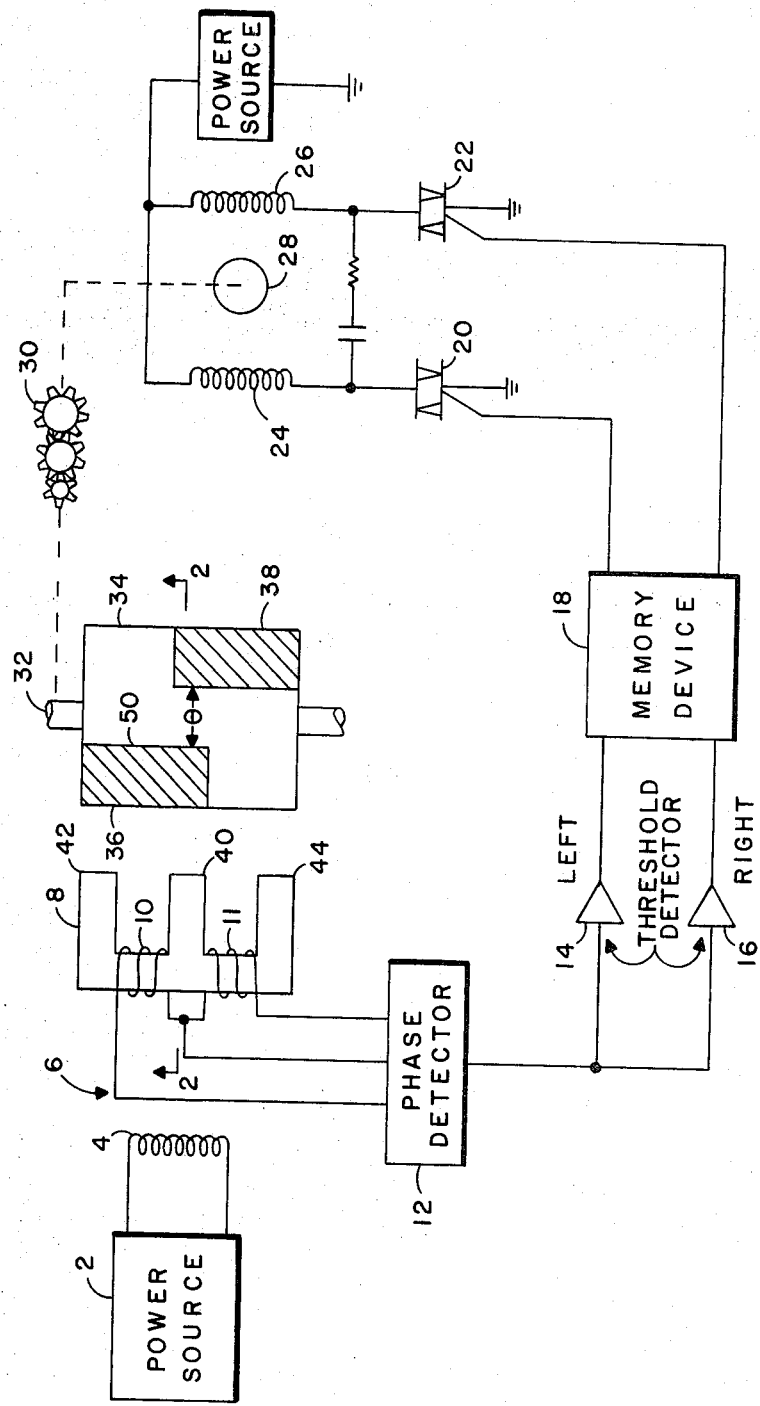

United States Patent
Byers et al.

[15] 3,639,821
[45] Feb. 1, 1972

[54] ELECTROMAGNETIC MOTOR REVERSING CONTROL

[72] Inventors: Charles A. Byers, Lenixa, Kans.; Robert A. Becker, Cedar Rapids, Iowa

[73] Assignee: Collins Radio Company, Cedar Rapids, Iowa

[22] Filed: Sept. 28, 1970

[21] Appl. No.: 76,184

[52] U.S. Cl. ............................................. 318/282, 318/300
[51] Int. Cl. ............................................. H02p 3/10
[58] Field of Search ............... 318/266, 267, 293, 300, 466, 318/138, 281, 282

[56] References Cited

UNITED STATES PATENTS 3,453,513   7/1969   Bates et al. ............................. 318/138

Primary Examiner—Bernard A. Gilheany
Assistant Examiner—W. E. Duncanson, Jr.
Attorney—Robert M. Sperry and Robert J. Crawford

[57] ABSTRACT

A motor control means for cyclically reversing an electric motor. The motor control includes an electromagnetic switch comprising a transformer having an E-shaped core and a center-tapped secondary winding, together with a pair of magnetic pole pieces carried by a rotatable shaft mounted in proximity with the transformer and driven by the motor to alternately cause the respective pole pieces to differentially influence the current flow through respective halves of the secondary winding and thereby produce a signal to effect reversal of the motor.

5 Claims, 2 Drawing Figures

PATENTED FEB 1 1972 3,639,821

INVENTORS.
ROBERT A. BECKER
CHARLES A. BYERS

BY *Robert M. Sperry*

ATTORNEY 3,639,821

ELECTROMAGNETIC MOTOR REVERSING CONTROL

This invention relates to motor control means and is particularly directed to electromagnetic means for cyclically reversing an electric motor.

It is often desirable to provide drive means which will cause some device to move in a first direction for a given period of time and, therefore, to move in a reverse direction for a similar period of time, and to repeat such operation on a cyclic basis. For example, such drive means may be employed to drive the work table of a planing machine or the antenna of a radar set. Numerous mechanisms have been provided heretofore for this purpose. However, none of the prior art devices have been entirely satisfactory. Some of the previous devices have employed a unidirectional motor together with mechanical reversing means, such as a scotch-yoke mechanism. However, these devices are expensive and bulky, require elaborate gearing systems, and are difficult to align and maintain. Other prior art devices have employed reversible motors having mechanical limit switches or the like to control reversal. However, the wear life of such mechanical switches is relatively short. Consequently, substantially constant supervision is required for these devices.

These disadvantages of the prior art are overcome with the present invention and cyclically reversing motor control means are provided which are relatively lightweight, compact, and inexpensive, yet are highly reliable and require virtually no maintenance.

The advantages of the present invention are preferably attained by employing an "E" transformer having a center-tapped secondary winding and providing a pair of magnetic pole pieces carried by a rotatable shaft mounted in proximity with the transformer to differentially influence the flux in respective halves of said secondary winding. A reversible electric motor is responsive to increased current flow in one-half of said secondary winding for operation in a first direction and to increased current flow in the other half of said secondary winding for operation in a second direction. The motor serves to oscillate said shaft as the motor cyclically reverses.

Accordingly, it is an object of the present invention to provide improved means for cyclically reversing electric motors.

Another object of the present invention is to provide electromagnetic means for cyclically reversing electric motors.

An additional object of the present invention is to provide cyclically reversing motor control means which are lightweight, compact, and inexpensive, yet are highly reliable and require virtually no maintenance.

A specific object of the present invention is to provide cyclically reversing motor control means comprising an "E" transformer having a center-tapped secondary winding, a pair of magnetic pole pieces rotatably mounted in proximity with said transformer to differentially influence the flux in respective halves of said secondary winding, and a reversible motor responsive to increase current flow in one-half of said secondary winding for operation in a first direction and to increased current flow in the other half of said secondary winding for operation in a second direction and serving to oscillate said pole pieces as the motor cyclically reverses.

These and other objects and features of the present invention will be apparent from the following detailed description taken with reference to the accompanying drawing.

Figure 2:
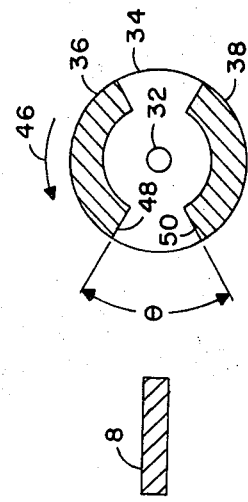

In the drawing:

FIG. 1 is a diagrammatic representation of a cyclically reversing motor control means embodying the present invention with the rotor thereof shown displaced 90° for clarity of illustration; and FIG. 2 is a transverse section through the rotor and transformer of FIG. 1 taken on the line 2—2 thereof, with the rotor shown properly oriented.

In that form of the present invention chosen for purposes of illustration, FIG. 1 shows a power supply 2 energizing the primary winding 4 of a transformer 6 having an E-shaped core 8 and center-tapped secondary windings 10 and 11. It should be noted that the secondary windings 10 and 11 are so wound that the current through winding 10 is 180° out of phase with the current through winding 11. A phase detector 12 is connected to the secondary windings 10 and 11 of transformer 6 and supplies signals through an appropriate one of a pair of threshold detectors, indicated at 14 and 16, to a suitable memory device 18. The memory device 18 passes signals through an appropriate one of a pair of solid-state, alternating-current switches 20 or 22 to energize an appropriate one of the windings 24 and 26 of a reversible electric motor 28. The motor 28 is coupled, through suitable gearing 30, to rotate shaft 32 which carries a rotor 34 formed of nonmagnetic material and having a pair of magnetic pole pieces 36 and 38 in proximity with the free ends of the core 8 of transformer 6. As best seen in FIG. 2, the rotor 34 is so positioned that the nonmagnetic portion is in proximity with the core 8 of transformer 6, while the magnetic pole pieces 36 and 38 are located on respective sides of the core 8. Pole pieces 36 and 38 spaced apart on the rotor 34 by an angle θ and longitudinally displaced on the rotor 34 (as best seen in FIG. 1). The pole pieces 36 and 38 are so dimensioned and positioned on rotor 34 that each serves to magnetically couple the central leg 40 of transformer core 8 with a respective one of the outer legs 42 and 44. Thus pole piece 36 serves to couple legs 40 and 42 of transformer core 8, while pole piece 38 serves to couple legs 40 and 44 of transformer core 8. The drive motor illustrated is a split-phase induction motor. Energization of one or the other of switches 20 and 22 provides a low impedance return path for the motor power source. The illustrated capacitor is thus placed in circuit with one or the other of the field winding 24 and 26 to establish bidirectional motor rotation depending upon which one of switches 20 and 26 is energized.

In operation, it will be assumed that motor 28 is initially operating in a direction such that it acts through gearing 30 to cause rotor 34 to rotate to the left, as indicated by arrow 46 in FIG. 2. Let it be assumed that switch 20 is fired to establish this direction of motor rotation. The length of travel of the device driven by motor 28 is determined by the spacing angle θ between the pole pieces 36 and 38 of rotor 34. Thus with rotor 34 turning in the direction indicated by arrow 46 in FIG. 2, the foregoing operations will continue until leading edge 48 of magnetic pole piece 36 moves into proximity with core 8 of transformer 6. When this occurs, pole piece 36 provides a magnetic flux path coupling legs 40 and 42 of core 8 of transformer 6 which causes an increase in the current flow through secondary winding 10. This increase in current is passed to phase detector 12 which senses the phase of the current and produces a signal pulse of appropriate polarity. As indicated above, the current developed in secondary winding 10 of transformer 6 will be 180° out of phase with the current developed in secondary winding 11. Accordingly, the polarity of the pulses developed by phase detector 12 will be positive for current increases through secondary winding 10 and negative for current increases through secondary winding 11 or vice versa. Obviously, the choice of polarities may be made as desired. However, for purposes of description, it will be assumed as stated. The positive pulse from phase detector 12 is passed through threshold detector 14 to memory device 18 which causes switch 20 to turn "OFF" and causes switch 22 to turn "ON." This causes motor 28 to reverse its operation and acts through gearing 30 to rotate rotor 34 in the direction opposite that indicated by arrow 46. Hence, the device controlled by motor 28 has reached the limit of its travel in one direction and has begun to move in the opposite direction. Operation in this direction will continue until leading edge 50 of magnetic pole piece 38 is brought into proximity with core 8 of transformer 6. Pole piece 38 will, then, form a flux path coupling legs 40 and 44 of transformer core 8 and will cause an increase in current flow through secondary winding 11 of transformer 6. Phase detector 12 will sense this increase in current through secondary winding 11 and, as indicated above, will develop a negative pulse signal which will be passed through threshold detector 16 to advise memory device 18 that the right-hand limit of travel has been reached. Memory device 18 then causes switch 22 to turn "OFF" and causes switch 20 to turn "ON." This causes motor 28 to resume operation in the original direction. This cyclic operation continues with motor 28 reversing its direction of operation each time rotor 34 moves the leading edge of one of the pole pieces 36 or 38 into proximity with the core 8 of transformer 6.

Obviously, the pole pieces 36 and 38 may be angularly displaced as desired about rotor 34, and it will be apparent that the angular displacement $\theta$ between the leading edges of pole pieces 36 and 38 defines the degree of rotation and the apparatus driven thereby. In addition, numerous variations and modifications may be made without departing from the present invention. Accordingly, it should be clearly understood that the form of the present invention described above and shown in the figure of the accompanying drawing is illustrative only and is not intended to limit the scope of the present invention.

What is claimed is:

1. A cyclically reversible drive system comprising:
    a reversible electric motor;
    a transformer having a primary winding, a center-tapped secondary winding, and a generally E-shaped core;
    switch means connected to said secondary winding and to said motor responsive to differential current flow from the two halves of said secondary winding to effect respective directions of rotation of said motor; and
    flux varying means operably associated with said E-shaped core and driven by said motor, said flux varying means responsive to cyclic reversals of said motor to periodically alter the flux through respective halves of said core to differentially alter the current flow through respective halves of said secondary winding.

2. The drive system of claim 1 wherein said switch means comprises:
    a phase detector connected to said secondary winding operative to sense increased current flow through either half of said secondary winding and to establish a pulse-type signal having a polarity indicative of which half of said secondary winding has increased flow,
    a pair of threshold detectors each connected to receive said pulse-type signal from said phase detector and each operative to pass only signals of a respective polarity,
    a pair of alternating current switches each connected in circuit to said motor and a motor energizing source and each actuable to effect a respective direction of motor rotation, and
    a memory device connected to said threshold detectors and to said alternating current switches and responsive to the polarity of said pulse-type signals to actuate an appropriate one of said alternating current switches and to deactuate the other of said alternating current switches.

3. The drive system of claim 1 wherein said flux varying means comprises:
    magnetic means, and
    positioning means operable in response to rotation of said motor to move said magnetic means into flux-varying relationship with alternate halves of said core.

4. The drive system of claim 3 wherein said magnetic means comprises:
    a pair of pole pieces.

5. The drive system of claim 4 wherein said positioning means comprises:
    a rotor.

* * * * *